US008919081B2

(12) United States Patent
Andreotti et al.

(10) Patent No.: US 8,919,081 B2
(45) Date of Patent: Dec. 30, 2014

(54) PACKAGING METHOD FOR PRODUCING SEALED PACKAGES OF A FOOD PRODUCT POURABLE INTO A TUBE OF PACKAGING MATERIAL

(75) Inventors: Stefano Andreotti, Modena (IT); Andrea Donati, Castelnuovo Rangone (IT); Marco Poppi, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 715 days.

(21) Appl. No.: 13/002,120

(22) PCT Filed: Aug. 7, 2009

(86) PCT No.: PCT/EP2009/060312
§ 371 (c)(1),
(2), (4) Date: Dec. 30, 2010

(87) PCT Pub. No.: WO2010/018141
PCT Pub. Date: Feb. 18, 2010

(65) Prior Publication Data
US 2011/0120059 A1    May 26, 2011

(30) Foreign Application Priority Data
Aug. 9, 2008 (EP) ................................. 08162127

(51) Int. Cl.
| B65B 9/20 | (2012.01) |
| B65B 51/30 | (2006.01) |
| B29C 65/18 | (2006.01) |
| B65B 9/207 | (2012.01) |
| B29C 65/00 | (2006.01) |
| B29L 9/00 | (2006.01) |
| B29K 23/00 | (2006.01) |
| B29L 31/00 | (2006.01) |
| B29K 711/12 | (2006.01) |
| B29K 305/02 | (2006.01) |

(52) U.S. Cl.
CPC ............ *B65B 9/207* (2013.01); *B29C 66/81457* (2013.01); *B29C 66/96* (2013.01);
(Continued)

(58) Field of Classification Search
CPC ............ B65B 3/28; B65B 3/30; B65B 51/30; B65B 51/306; B65B 9/2021; B65B 9/207
USPC ................... 53/451, 551, 502, 503
See application file for complete search history.

(56) References Cited

U.S. PATENT DOCUMENTS 3,522,689 A  *  8/1970  Wylie et al. ..................... 53/552
3,629,987 A    12/1971  Klopfenstein et al.
(Continued)

FOREIGN PATENT DOCUMENTS

| DE | 44 25 207 | 1/1996 |
| EP | 0 469 819 | 2/1992 |

(Continued)

OTHER PUBLICATIONS

International Search Report (PCT/ISA/210) issued on Nov. 6, 2009, by European Patent Office as the International Searching Authority for International Application No. PCT/EP2009/060312.

(Continued)

*Primary Examiner* — Stephen F Gerrity
(74) *Attorney, Agent, or Firm* — Buchanan Ingersoll & Rooney PC

(57) ABSTRACT

A method of producing a sealed package of a pourable food product involving feeding a tube of packaging material along an axis; moving a pair of first jaws and a pair of second jaws cyclically and alternately along sealing paths parallel to the axis, and along repositioning paths; moving the jaws, as they travel along the sealing paths, into a closed position in which the sealing members grip the tube and respectively form, at different times, a first and a second seal sealing the tube and defining respective opposite ends of the package; and moving the jaws, as they travel along the respective repositioning paths, into an open position, in which they are detached from the tube; acquiring a desired value of a quantity related to the package weight; and forming the second seal at a distance, which is a function of the value, from the first seal.

9 Claims, 8 Drawing Sheets

(52) U.S. Cl.
CPC ........... *B65B 51/306* (2013.01); *B29C 66/1122* (2013.01); *B29L 2009/00* (2013.01); *B29C 66/7373* (2013.01); *B29C 66/84121* (2013.01); *B29K 2023/086* (2013.01); *B29L 2031/7166* (2013.01); *B29C 66/90* (2013.01); *B65B 9/2049* (2013.01); *B29C 65/18* (2013.01); *B29C 66/8412* (2013.01); *B29K 2711/123* (2013.01); *B29K 2023/06* (2013.01); *B29K 2023/12* (2013.01); *B29C 66/83543* (2013.01); *B29K 2995/0067* (2013.01); *B29C 66/4312* (2013.01); *B29K 2305/02* (2013.01); *B29C 66/8491* (2013.01)
USPC .................... 53/451; 53/502; 53/503; 53/551

(56) References Cited

U.S. PATENT DOCUMENTS

| | | | | |
|---|---|---|---|---|
| 3,892,060 | A * | 7/1975 | Stanley, Jr. | 53/127 |
| 4,128,985 | A * | 12/1978 | Simmons | 53/502 |
| 4,750,313 | A * | 6/1988 | Kammler et al. | 53/451 |
| 5,220,771 | A * | 6/1993 | Burns | 53/551 |
| 5,241,800 | A * | 9/1993 | Steinke et al. | 53/503 |
| 6,038,838 | A * | 3/2000 | Fontanazzi | 53/551 |
| 6,044,628 | A * | 4/2000 | Katayama et al. | 53/552 |
| 6,079,188 | A * | 6/2000 | Katayama et al. | 53/451 |
| 6,604,343 | B2 * | 8/2003 | Fukuda | 53/551 |
| 6,625,517 | B1 * | 9/2003 | Bogdanov et al. | 700/193 |
| 6,729,113 | B2 * | 5/2004 | Miyamoto et al. | 53/551 |
| 6,877,295 | B1 * | 4/2005 | Benedetti et al. | 53/451 |
| 7,059,100 | B2 * | 6/2006 | Babini et al. | 53/552 |
| 2004/0168407 | A1 | 9/2004 | Borghi et al. | |
| 2007/0017189 | A1 * | 1/2007 | Konno et al. | 53/551 |

FOREIGN PATENT DOCUMENTS

| | | |
|---|---|---|
| EP | 0 959 007 | 11/1999 |
| EP | 0 960 817 | 12/1999 |
| EP | 1 266 832 | 12/2002 |

OTHER PUBLICATIONS

Written Opinion (PCT/ISA/237) issued on Nov. 6, 2009, by European Patent Office as the International Searching Authority for International Application No. PCT/EP2009/060312.

* cited by examiner

PACKAGING METHOD FOR PRODUCING SEALED PACKAGES OF A FOOD PRODUCT POURABLE INTO A TUBE OF PACKAGING MATERIAL

TECHNICAL FIELD

The present invention relates to a packaging method and unit for producing sealed packages of a food product pourable into a tube of packaging material.

Many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

BACKGROUND ART

As is known, packages of this sort are produced on fully automatic packaging units, on which a continuous tube is formed from the web-fed packaging material; the web of packaging material is sterilized in the packaging unit, e.g. by applying a chemical sterilizing agent such as a hydrogen peroxide solution, which is subsequently removed, e.g. by heating and evaporation, from the surfaces of the packaging material.

The sterilized web is maintained in a closed, sterile environment, and is folded into a cylinder and sealed longitudinally to form a tube.

The tube is fed in a vertical direction parallel to its axis, and is filled continuously with the sterilized or sterile-processed food product.

Packaging units are known which interact with the tube to heat seal it at equally spaced cross sections to form pillow packs connected to the tube by transverse sealing strips.

More specifically, the unit comprises two forming assemblies movable along respective runners and which interact cyclically and successively with the tube to heat seal the packaging material of the tube.

Each forming assembly comprises a slide movable back and forth along the respective runner; and two jaws hinged at the bottom to the respective slide, and movable between a closed position cooperating with the tube to heat seal it, and an open position detached from the tube.

The movements of the forming assemblies are offset by a half-period: the slide of one forming assembly moves upwards with its jaws in the open position, as the slide of the other forming assembly moves downwards with its jaws in the closed position to prevent collision and interference.

The jaws of each forming assembly have respective sealing members which cooperate with opposite sides of the tube and comprise, for example, a heating member, and an elastomeric member for providing mechanical support to grip the tube to the required pressure.

Each forming assembly also comprises two forming members comprising respective forming half-shells hinged to the respective jaws.

Each pair of forming half-shells moves cyclically between an open position detached from the tube, and a closed position contacting the tube to fold it between two consecutive sealing sections and so define and control the volume of the package being formed.

More specifically, the sealing members of a first forming assembly seal the package at the bottom, and the half-shells of the first forming assembly control the volume of the package being formed, while the sealing members of the second forming assembly seal the top of the package.

To conform with the legal requirements imposed in certain countries, the volume and/or weight of the food product in the package must be controlled as accurately and repeatably as possible.

A need is felt within the industry to control the volume of the food product in the package without stopping the packaging unit and so reducing the output rate of the unit, and without leaving any marks on the packages themselves.

A need is also felt within the industry to control the above volume for a wide range of food products of widely differing viscosity, and/or for a wide range of output rates of the packaging unit.

DISCLOSURE OF INVENTION

It is an object of the present invention to provide a method of producing a sealed package of a food product pourable into a tube of packaging material, designed to meet at least one of the above requirements in a straightforward, low-cost manner.

According to the present invention, there is provided a method of producing a sealed package of a food product pourable into a tube of packaging material.

According to the present invention, there is also provided a packaging unit for producing sealed packages of a food product pourable into a tube of packaging material.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
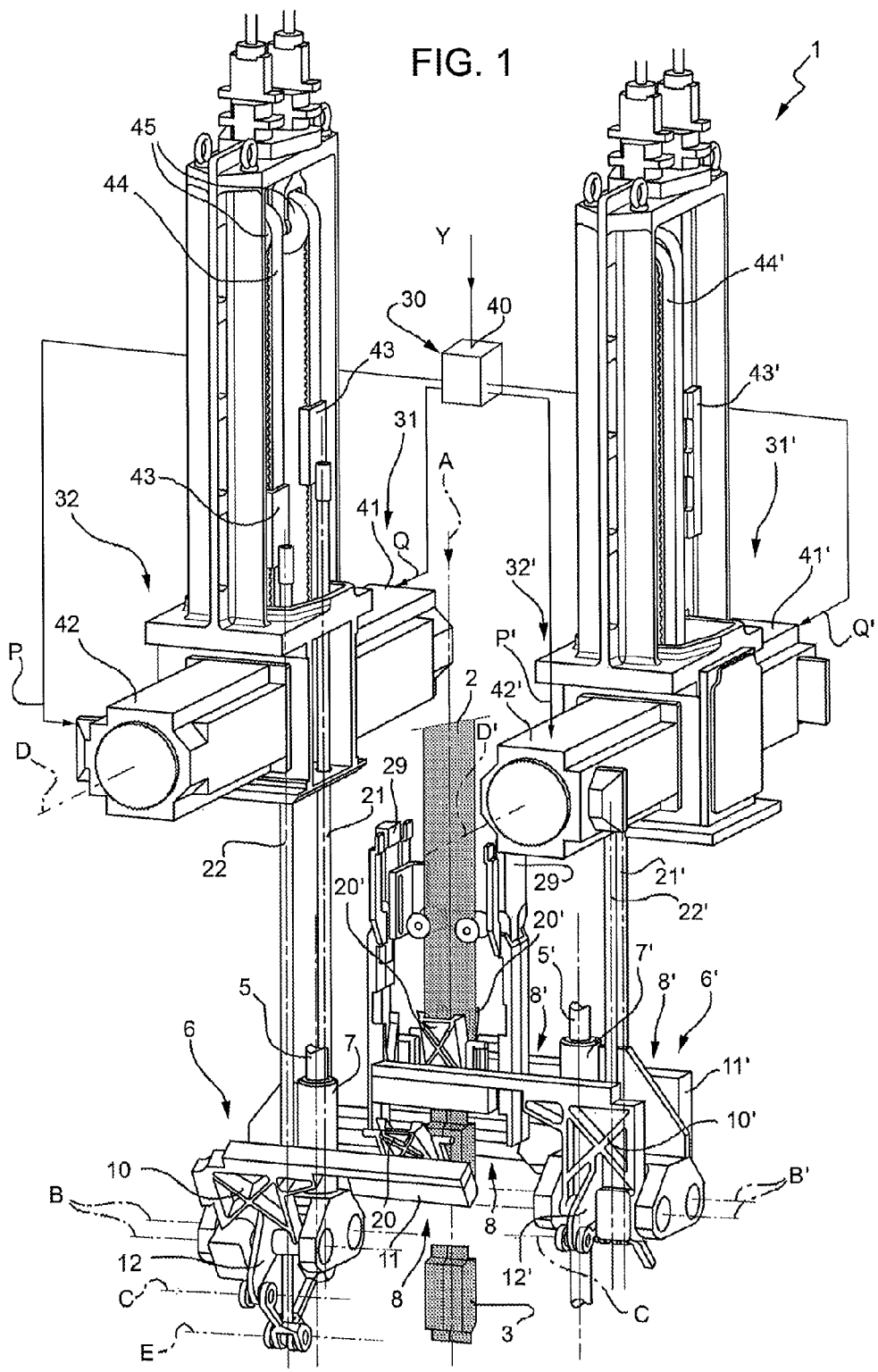
FIG. 1 shows a view in perspective, with parts removed for clarity, of a packaging unit for producing packages of a food product pourable into a tube of packaging material.

Number 1 in FIG. 1 indicates as a whole a packaging unit for producing sealed packages 3 (FIGS. 1, 5, 6, 7) of a food product from a tube 2 of sheet packaging material.

Unit 1 preferably produces sealed packages 3 of a pourable food product, such as pasteurized or UHT milk, fruit juice, wine, etc.

Unit 1 may also produce sealed packages 3 of a food product which is pourable into tube 2 when producing packages 3, and sets after packages 3 are sealed. One example of such a food product is a portion of cheese, which is melted when producing packages 3, and sets after packages 3 are sealed.

The packaging material has a multilayer structure (not shown) and comprises a layer of fibrous material, normally paper, covered on both sides with respective layers of heat-seal plastic material, e.g. polyethylene. In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of package 3 eventually contacting the food product.

Tube 2 is formed in known manner by longitudinally folding and sealing a web (not shown) of heat-seal sheet material, is filled by a fill pipe (not shown) with the sterilized or sterile-processed food product for packaging, and is fed, in known manner not shown, along a vertical path indicated by a downward axis A in FIG. 1.

Unit 1 comprises two forming assemblies 6, 6' which move along respective vertical cylindrical runners 5, 5' symmetrical with respect to axis A, and interact cyclically with tube 2 to grip and heat seal it along respective equally spaced cross sections crosswise to axis A, to form a number of pillow packs 3 (FIG. 6) connected to tube 2 by respective sealing strips 9a, 9b crosswise to axis A.

Figure 6:
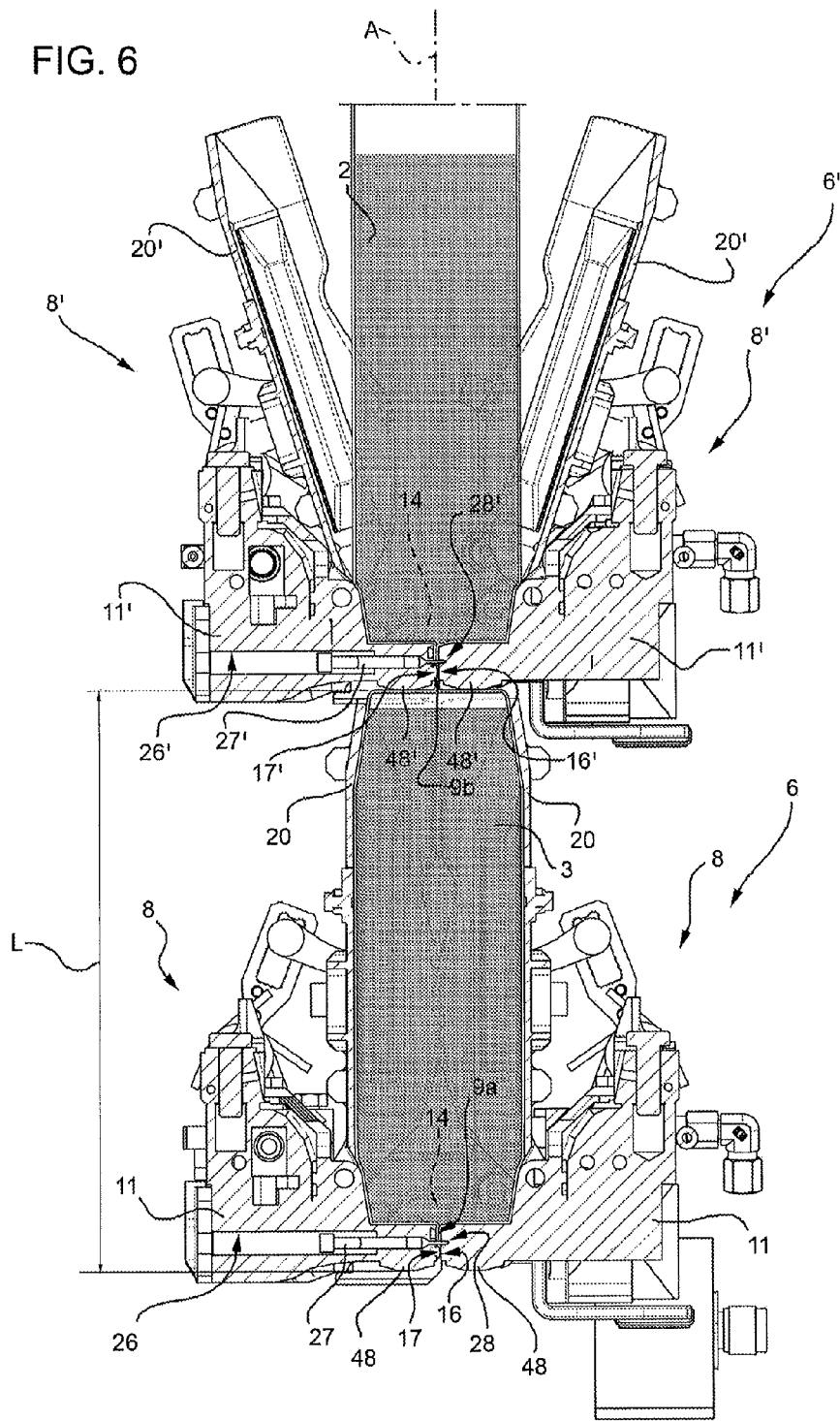
FIG. 6 shows the FIG. 1 pairs of jaws in the course of a second step in producing the sealed package.
Figure 7:
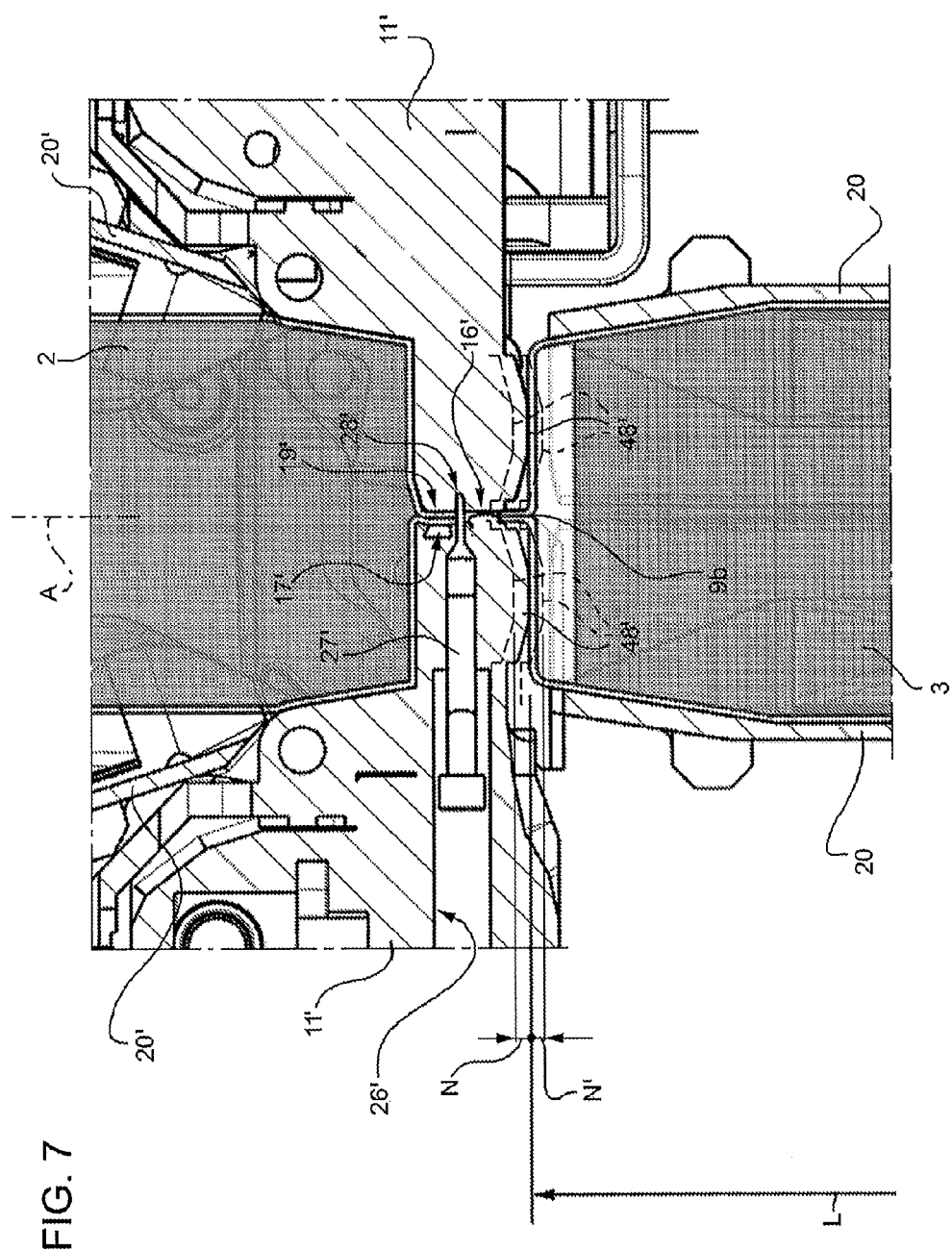
FIG. 7 shows an enlarged detail of FIG. 6.

As shown in FIGS. 6 and 7, sealing strips 9a, 9b define the bottom and top of package 3 respectively.

Being known and identical, only one of assemblies 6, 6' (assembly 6) is described below, identical or corresponding parts of assemblies 6, 6' being indicated in the drawings using the same reference numbers.

Assembly 6 (FIG. 1) substantially comprises:
a slide 7 which runs up and down respective runner 5 in a direction parallel to axis A; and
two jaws 8 which are hinged at the bottom to slide 7 about respective horizontal axes B perpendicular to axis A, are located on opposite sides of tube 2, and rotate about respective axes B between a closed position (shown in FIGS. 5 and 6 relative to jaws 8 of assembly 6) gripping tube 2, and a fully-open position, in which they are furthest away from tube 2, and in which corresponding points of the jaws are furthest apart in a direction perpendicular to axis A.

More specifically, each jaw 8 comprises:
a base portion 10 hinged at its bottom end, about respective axis B, to a bottom portion of slide 7;
an arm 11 which interacts with tube 2, is connected to portion 10, and extends perpendicular to axis A when jaws 8 are in the closed position; and
an appendix 12 (FIGS. 3 and 4) projecting from portion 10 on the opposite side to axis A.

Figure 3:
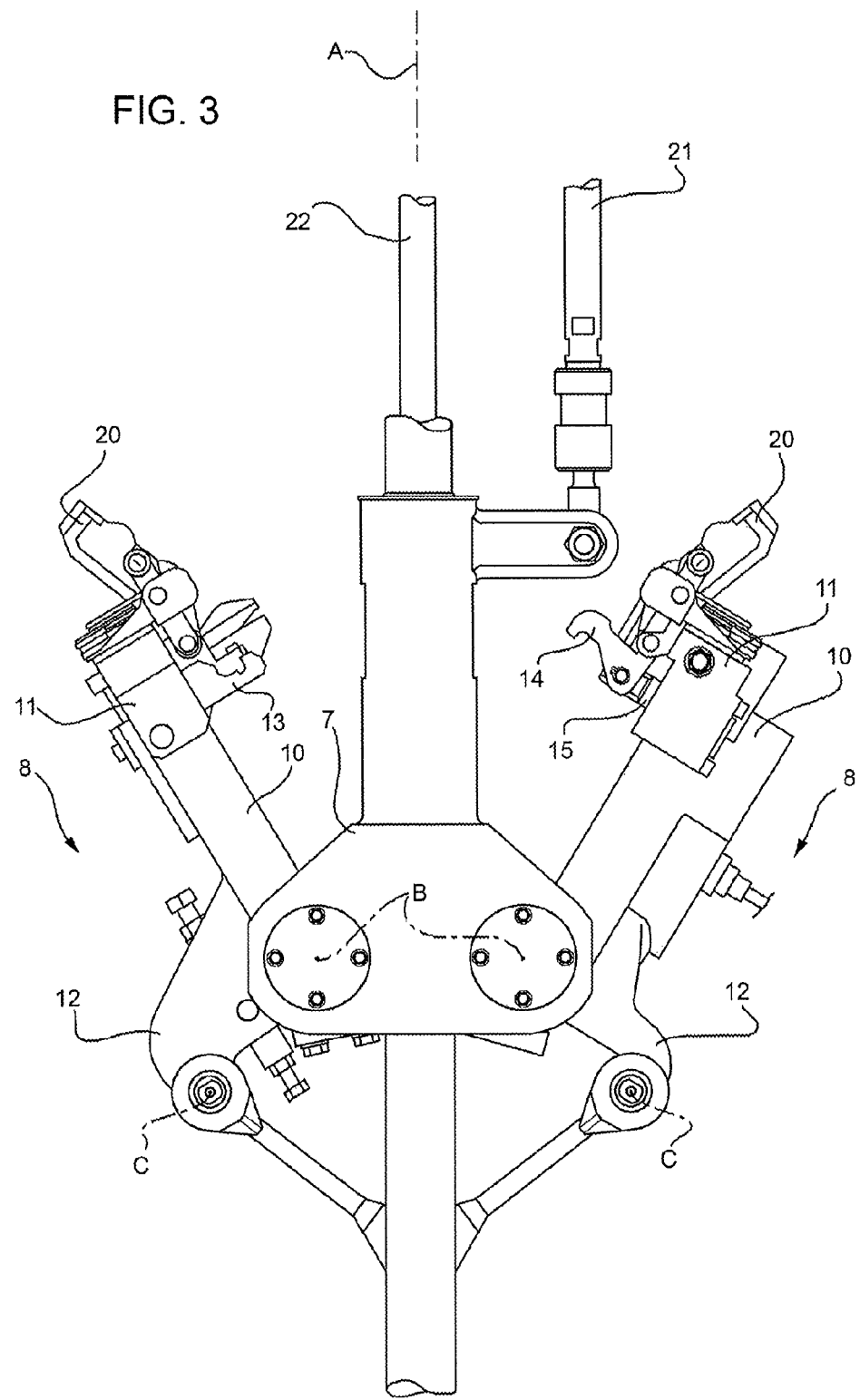
FIGS. 3 and 4 show further enlarged details of the FIG. 1 unit.
Figure 4:
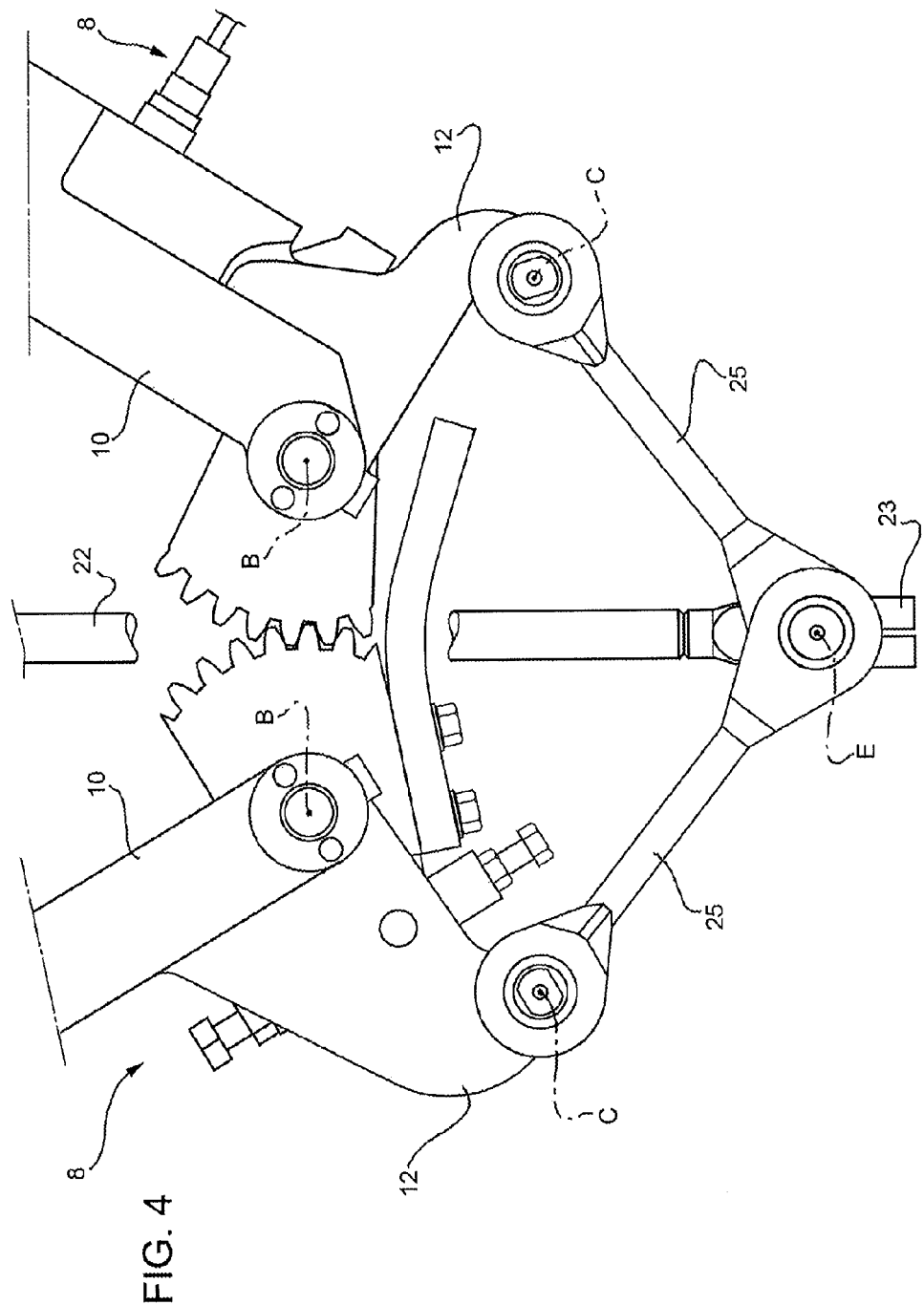

As shown in FIG. 3, assembly 6 also comprises a first fastener 13 fitted integrally to one end of arm 11 of one of jaws 8; a second fastener 14 hinged to one end of arm 11 of the other jaw 8 about an axis parallel to axes B; and a hydraulic cylinder 15 (only shown partly) for gripping fasteners 13, 14 in an engaged position.

Portions 10 of jaws 8 comprise respective sector gears (FIG. 4) which mesh to ensure jaws 8 rotate by the same angle about respective axes B between the closed and open position.

Assembly 6 also comprises a known sealing device, not shown in the drawings, for heat sealing each cross section of tube 2 of packaging material gripped between relative jaws 8, to form sealing strip 9a.

The sealing device of assembly 6 (FIGS. 5 and 6) substantially comprises a heating member 16 fitted to arm 11 of one jaw 8, and which interacts with tube 2 by means of two active surfaces; and two pressure pads 17 fitted to arm 11 of the other jaw 8, and which cooperate with respective active surfaces of heating member 16 to grip and heat seal tube 2.

Jaws 8 therefore perform a translatory movement parallel to axis A by virtue of the up and down movement of slide 7; and an opening and closing movement onto tube 2 of packaging material by rotating about respective hinge axes B to slide 7, and which is superimposed on the vertical up and down translatory movement of slide 7.

Figure 8:
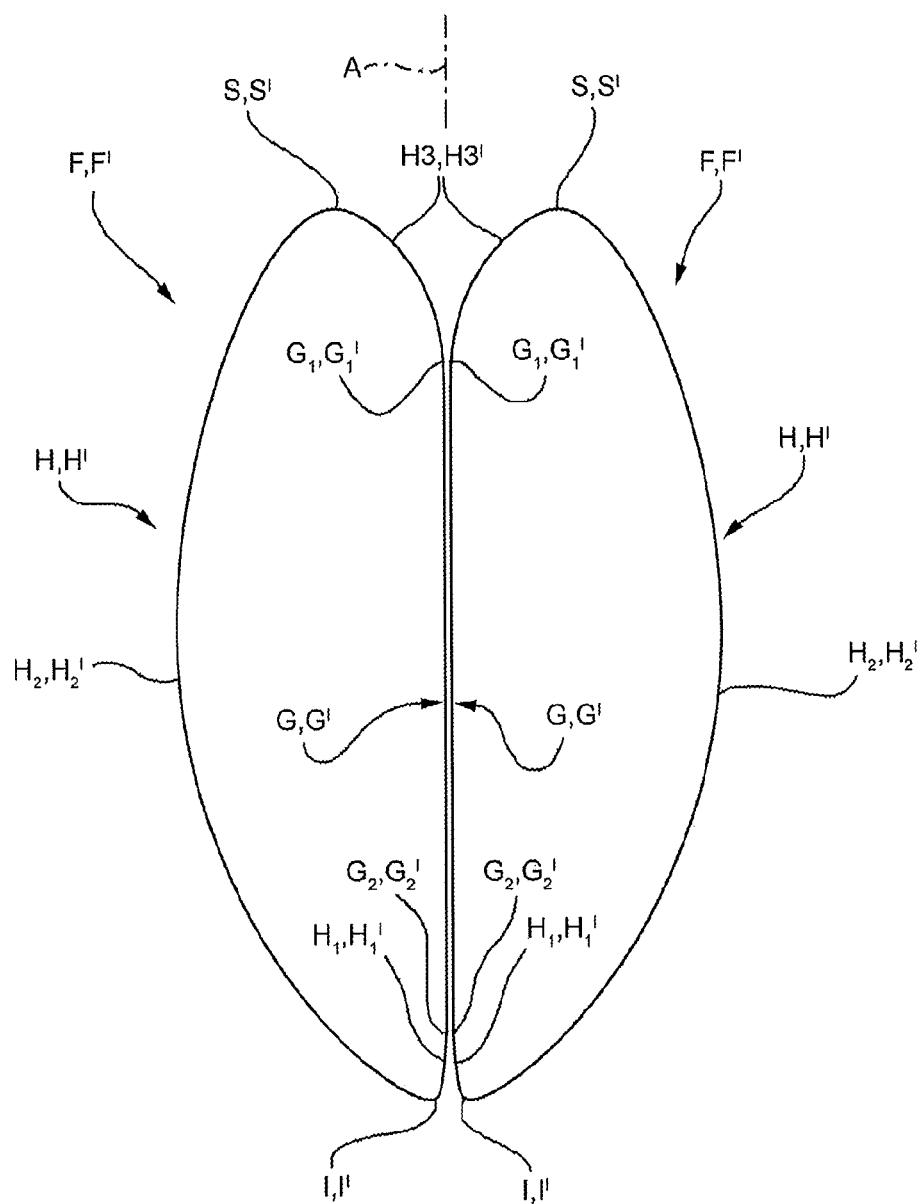
FIG. 8 shows a schematic of the paths travelled by the jaws in FIGS. 1, 6 and 7.

More specifically, by virtue of the above movements, heating member 16 and pads 17 of jaws 8 travel along respective endless paths F (FIGS. 7 and 8), each comprising a sealing path G parallel to axis A, and a repositioning path H.

More specifically, jaws 8 are set to the closed position and cooperate with the cross section of tube 2 to form sealing strip 9a along the sealing paths G of heating member 16 and pads 17, and are detached from tube 2 and move from the closed to the fully-open position, and vice versa, along the repositioning paths H of heating member 16 and pads 17.

From a bottom end $G_2$ to a top end $G_1$ of relative sealing path G in the travelling direction of jaws 8, each repositioning path H comprises:
a portion $H_1$, at the end of which jaws 8 are partly open, and heating member 16 and pads 17 are in respective bottom dead-centre positions I;
a portion $H_2$, along which jaws 8 first move from their respective bottom dead-centre positions I into respective fully-open positions, and then begin moving into respective partly-closed positions which are eventually reached at respective top dead-centre positions S; and
a portion $H_3$, along which jaws 8 reach respective closed positions.

More specifically, the distance, measured crosswise to axis A, between heating member 16 and pads 17 of jaws 8 increases along portions $H_1$, first increases and then decreases along portions $H_2$, and decreases along portions $H_3$ of respective repositioning paths H.

As slide 7 moves down, heating member 16 and pads 17 travel along sealing path G and portions $H_1$, $H_3$; and, as slide 7 moves up, heating member 16 and pads 17 travel along portion $H_2$ of repositioning path H.

Heating members 16, 16' and pads 17, 17' of jaws 8, 8' travel along respective paths F, F' in offset manner, so that arms 11 (11') of jaws 8 (8') moving down along sealing path G in the closed position pass between arms 11' (11) of jaws 8' (8) moving back up along portion $H_2'$ ($H_2$) in the fully-open position.

Heating member 16 and pads 17 of jaws 8 cooperate with one another along sealing paths G of respective paths F to form sealing strip 9a.

Figure 5:
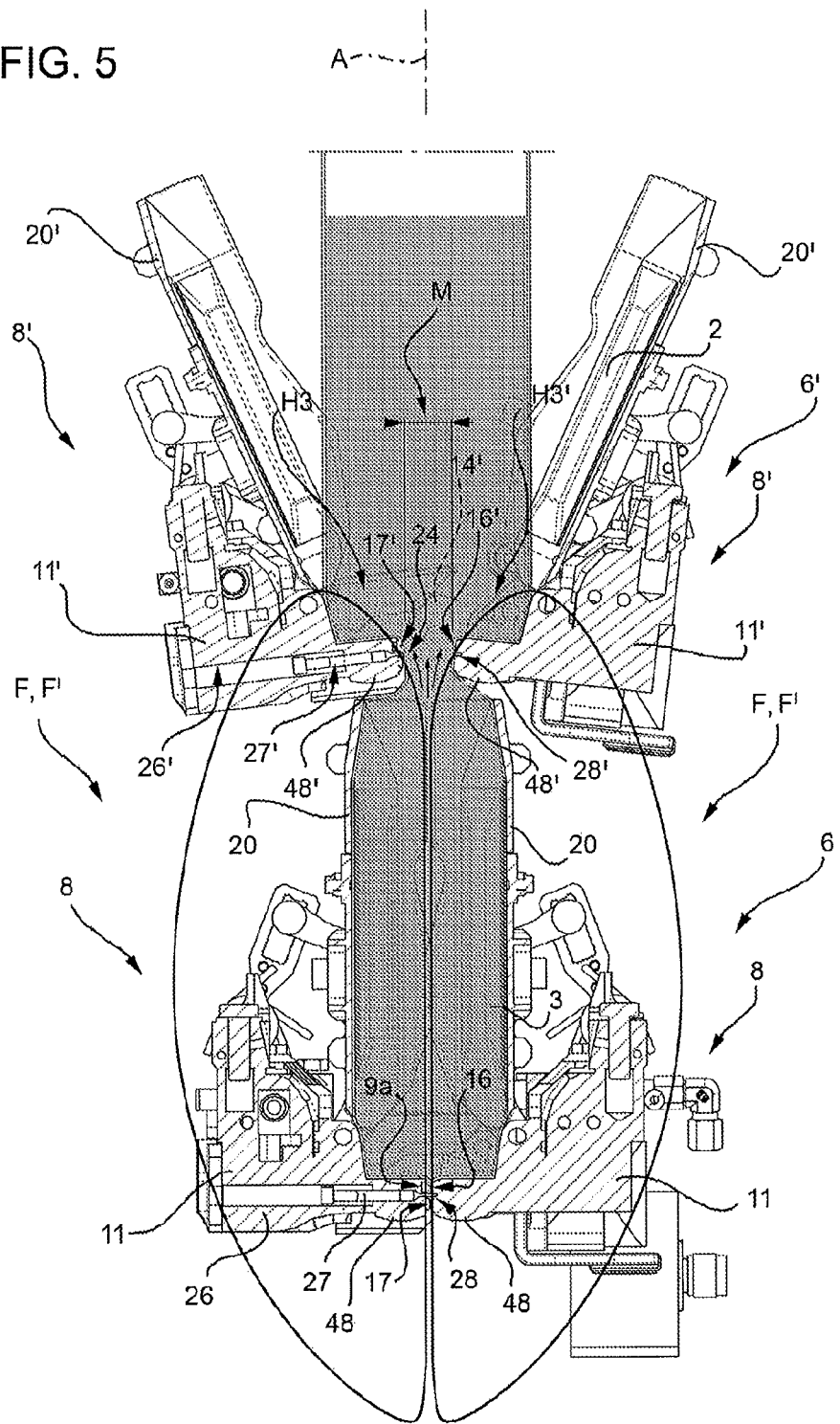
FIG. 5 shows a larger-scale view of two pairs of jaws of the FIG. 1 unit in the course of a first step in producing a sealed package.

FIG. 5 shows a situation in which heating member 16' and pads 17' are travelling along respective portions $H_3'$; heating member 16 and pads 17 have already formed sealing strip 9a and are coming to the end of respective sealing paths G; and heating members 16' and pads 17' define, on opposite sides of axis A, a channel 24, of width M, through which a quantity of food product above sealing strip 9a flows (FIG. 5). More specifically, the formation of sealing strip 9a pumps the quantity of pourable food product in the opposite direction to the travelling direction of tube 2, i.e. upwards.

The movement of slide 7 parallel to axis A is controlled by a rod 21 movable parallel to axis A and connected rigidly to and alongside slide 7.

The opening and closing movement of jaws 8 is controlled by a rod 22 movable parallel to axis A; and by two connecting rods 25 (FIGS. 1, 3, 4) which have respective first ends hinged to an axial end 23 of rod 22 about an axis E parallel to axes B, and respective second ends, opposite the first ends, hinged to appendixes 12 of respective jaws 8 about respective axes C parallel to axes B.

More specifically, by means of connecting rods 25, translation of rod 22 parallel to axis A rotates appendixes 12 about respective axes C, and so rotates jaws 8 between the closed and fully-open position about respective axes B.

Assembly 6 also comprises two forming half-shells 20 (FIGS. 1, 6, 7) facing each other on opposite sides of axis A and hinged to respective jaws 8 about respective axes parallel to axes B, C.

As heating member 16 and pads 17 of jaws 8 travel along respective paths F, half-shells 20 perform a work cycle comprising:
  a closing stroke, in which they are moved, by springs not shown, from an open position (shown in FIG. 5 relative to half-shells 20' of assembly 6') to a closed position (shown in FIGS. 5 and 6 relative to half-shells 20 of assembly 6);
  a volume-control stroke, in which half-shells 20 cooperate with tube 2 in the closed position; and
  a return stroke, in which half-shells 20 remain detached from tube 2.

More specifically, half-shells 20 perform the closing stroke, volume-control stroke, and return stroke as heating member 16 and pads 17 travel along relative portions $H_3$, sealing paths G, and relative portions $H_1$, $H_2$ of relative paths F respectively.

The above work cycle is controlled by two cams 29 (FIG. 1) located on opposite sides of axis A and interacting with respective rollers fitted to half-shells 20.

Arm 11 of one jaw 8 of assembly 6 (FIGS. 5 and 6) has a first seat 26 and a knife 27. Knife 27 is normally set to a rest position housed inside first seat 26, and, once relative sealing strip 9a is formed, slides into an extracted position in which its cutting end projects from first seat 26 to cut sealing strip 9a and detach package 3 from the rest of tube 2.

Arm 11 of the other jaw 8 of assembly 6 has a second seat 28 for receiving the cutting end of the relative knife as each package 3 is detached from the rest of tube 2.

Unit 1 advantageously comprises:
  an acquisition unit 40 (only shown schematically in FIGS. 1 and 2) for acquiring a value Y of a quantity related to the weight of a package 3;
  two actuator assemblies 31, 31' for moving respective jaws 8, 8' parallel to axis A; and
  a processing unit 30 for generating, on the basis of the value Y, a first and second control scheme Q, Q' governing actuator assemblies 31, 31' respectively. The first and second control scheme Q, Q' are generated to position heating member 16' and pads 17' at a distance L—along axis A and as a function of value Y—from heating member 16 and pads 17 respectively, as heating member 16' and pads 17' form sealing strip 9b, and after sealing strip 9a is formed.

Unit 1 thus forms sealing strips 9a, 9b of each package 3 at a respective distance L which is a function of respective value Y.

More specifically, as unit 1 is running, acquisition unit 40 receives value Y directly from an operator, or from a scale which weighs package 3 at the output of unit 1.

Value Y preferably corresponds to the desired weight or volume of package 3.

More specifically, actuator assemblies 31, 31' move respective rods 21, 21' parallel to axis A to also move respective slides 7, 7' and jaws 8, 8' parallel to axis A.

On the basis of at least a first parameter corresponding to the viscosity of the food product, or a second parameter corresponding to the output rate of unit 1, unit 30 also provides for adjusting the distance—measured perpendicular to axis A—between heating member 16' (16) and pads 17' (17) of jaws 8' (8), as heating member 16' (16) and pads 17' (17) of jaws 8' (8) travel along portions $H_3'$ ($H_3$) of repositioning paths H, H', and after jaws 8 (8') have formed sealing strip 9a (9b).

In other words, unit 30 adjusts the width M of channel 24, defined by heating member 16' (16) and pads 17' (17) of jaws 8' (8), on the basis of the first and/or second parameter, before jaws 8' (8) form sealing strip 9b (9a).

Unit 1 also comprises two actuator assemblies 32, 32' for moving respective rods 22, 22' parallel to axis A and so moving respective jaws 8, 8' between the closed and open positions. Actuator assemblies 32, 32' are also controlled by respective control schemes P, P' generated by unit 30 on the basis of the first and/or second parameter.

Actuator assemblies 31, 31' and 32, 32' being identical, only actuator assemblies 31, 32 are described below; identical or corresponding parts of actuator assemblies 31, 31' and 32, 32' being indicated in the drawings using the same reference numbers.

Figure 2:
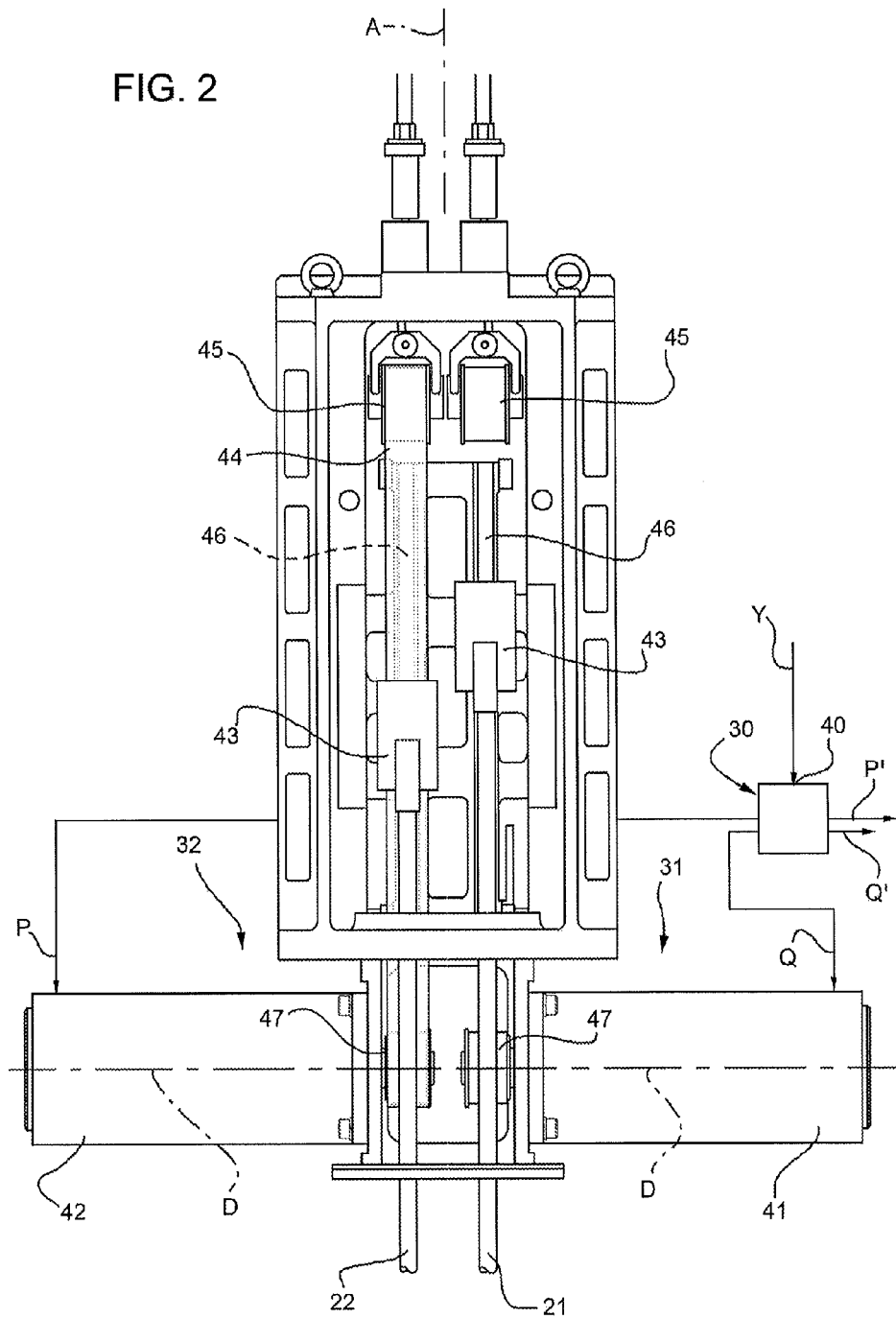
FIG. 2 shows a larger-scale side view of part of the FIG. 1 unit.

Each actuator assembly 31, 32 comprises (FIGS. 1 and 2):
  a servomotor 41, 42 controlled by respective control scheme P, Q, and which rotates a pulley 47 about an axis D, perpendicular to axis A, in accordance with a clockwise scheme determined by respective control scheme P, Q;
  a toothed belt 44 (only one of which is shown in FIG. 2) having two curved end portions wound about pulley 47 (FIG. 2) and a return pulley 45 respectively; and two branches parallel to axis A and extending between pulleys 47 and 45; and
  a member 43 sliding parallel to axis A and fixed to a branch of belt 44 and to relative rod 21, 22 to convert rotation of relative pulleys 47, 45 about axis D to translation of respective rod 21, 22 along axis A.

More specifically, pulleys 45 are fixed to a fixed structure of unit 1 to rotate about respective axes parallel to axis D.

In the example shown, axis D is horizontal.

Rods 22, 21 slide along respective vertical guides 46 parallel to axis A.

More specifically, as unit 1 is running, each control scheme Q, Q' is generated by unit 30 as the sum of:
  an addend $Q_1$, $Q_1'$ independent of value Y and for generating predetermined basic trajectories of rods 21, 21' and, hence, predetermined time schemes governing the up and down movement of jaws 8, 8';
  an addend $Q_2(Y)$, $Q_2'(Y)$, which is a function of value Y and generated to adjust the distance L between sealing strips 9a, 9b; and an addend $Q_3$, $Q_3'$, which is a function of the position of a bar code of package 3 and generated to ensure the bar code of each package 3 is located in a predetermined position on package 3.

Addends $Q_2(Y)$, $Q_2'(Y)$ are generated so that, once jaws 8 (8') are in the closed position and heating member 16 (16') and pads 17 (17') have formed the bottom sealing strip 9a (9b) of each package 3, rod 21' (21) positions heating member 16' (16) and pads 17' (17) of jaws 8' (8) at a distance L—which is a function of value Y—from heating member 16 (16') and pads 17 (17') of jaws 8 (8') respectively, at least at the instant in which sealing strip 9a (9b) is formed.

Distance L is measured parallel to axis A, between corresponding points, e.g. the bottom ends 48, 48' of heating members 16, 16' and pads 17, 17', and is related to the final height of package 3 (FIG. 6).

As shown in FIG. 7, alongside variations in value Y, actuator assemblies 31, 31' adjust the distance between bottom ends 48' 48 (not shown) and, hence, the distance L between sealing strips 9a, 9b. In the FIG. 7 example, the variation in value Y produces a shift in bottom ends 48' from the positions shown by the continuous line to the positions shown by the dash line, thus producing a corresponding increase N or reduction N' in distance L.

Each control scheme P, P' is generated as the sum of:
an addend $P_1$, $P_1'$ independent of the viscosity of the pourable product and the output rate of unit 1, and for generating predetermined basic trajectories of jaws 8, 8' as they move between the open and closed positions along paths F, F'; and
an addend $P_2$, $P_2'$, which is a function of the viscosity of the pourable product and/or the output rate of unit 1, and adjusts the basic trajectories of jaws 8, 8' along portions $H_3$, $H_3'$ of repositioning paths H, H'.

In other words, the trajectories of jaws 8, 8' between the fully-open and closed positions are determined by the basic trajectories as heating member 16, 16' and pads 17, 17' travel along sealing paths G, G', portions $H_1$, $H_1'$ and $H_2$, $H_2'$; and are determined by the sum of the basic trajectory and a correction determined by addends $P_2$, $P_2'$ as heating member 16, 16' and pads 17, 17' travel along portions $H_3$, $H_3'$.

Addends $P_1$, $P_1'$ are preferably generated to keep heating members 16, 16' and respective pads 17, 17' pressed against tube 2 along respective sealing paths G, G', to prevent any slack, perpendicular to axis A, between the heating member 16, 16' and respective pads 17, 17' of each assembly 6, 6' when relative jaws 8, 8' are in the closed position.

Addends $P_1$, $P_1'$ thus compensate for any first slack, perpendicular to axis A, produced between heating members 16, 16' and respective pads 17 17' by inevitable tolerances and inaccuracy in the approach trajectories of fasteners 13, 14, 13', 14' and in the gripping force of cylinders 15, 15', and which are particularly manifested at high output rates of unit 1.

Addends $P_1$, $P_1'$ also compensate for any second slack, perpendicular to axis A, produced by fasteners 13, 14, 13', 14' being released before heating members 16, 16' and respective pads 17, 17' complete respective sealing paths G, G' and reach respective bottom ends $G_2$, $G_2'$. The effect of the first and second slack would be to position heating members 16, 16' and respective pads 17, 17' a given distance apart, perpendicular to axis A, when jaws 8, 8' are still in the closed position.

Once jaws 8 (8') have formed sealing strip 9a (9b), and before jaws 8' (8) form sealing strip 9b (9a), addends $P_2$, $P_2'$ adjust, on the basis of the first and/or second parameter, the width M of channel 24, i.e. the distance, measured perpendicular to axis A, between heating member 16' (16) and pads 17' (17) of jaws 8' (8).

In other words, addends $P_2$, $P_2'$ are generated to adjust the width M of channel 24 as heating member 16' (16) and respective pads 17' (17) of jaws 8 (8') travel along portions $H_3$ ($H_3'$), and heating member 16' (16) and respective pads 17' (17) of jaws 8' (8) travel along sealing paths G (G').

A software program loaded and executed on unit 30 employs an algorithm which generates respective control schemes Q, Q' for each Y value, and respective control schemes P, P' for each output rate of unit 1 and/or each viscosity of the food product.

In other words, unit 30 acts like a pair of "electronic cams", one of which assigns each Y value respective time schemes governing the movement of rods 21 parallel to axis A, and the other of which assigns each output rate of unit 1 and/or each viscosity of the food product respective time schemes governing the movement of rods 22 parallel to axis A.

In actual use, tube 2, filled with the liquid food product, is fed along axis A; and the operator, without stopping unit 1, keys in the desired weight value Y of package 3.

Acquisition unit 40 acquires the Y value; and unit 30, as a function of the Y value and by executing the software program implemented, generates control schemes Q, Q' governing servomotors 41, 41'. By means of respective pulleys 47, 45, respective belts 44, and respective members 43, servomotors 41, 41' move respective rods 21, 21' parallel to axis A and in accordance with time schemes determined by control schemes Q, Q', so that slides 7, 7' move up and down in offset manner with respect to each other and in accordance with respective time schemes determined by control schemes Q, Q'.

The operator can also set the first parameter corresponding to the output rate of unit 1 and/or the second parameter corresponding to the viscosity of the pourable food product.

On the basis of the first and/or second parameter, and by executing the software program implemented, unit also generates control schemes P, P' governing servomotors 42, 42', which, by means of pulleys 47, 45, belts 44, and members 43, move rods 22, 22' parallel to axis A in accordance with time schemes determined by control schemes P, P'.

By means of connecting rods 25, 25', the movement of rods 22, 22' parallel to axis A moves jaws 8, 8' between the closed and open position.

More specifically, control schemes P, P', Q, Q' are generated so that the heating members 16, 16' and pads 17, 17' of jaws 8, 8' travel along respective paths F, F' in offset manner. That is, heating member 16 (16') and pads 17 (17') of jaws 8 (8') "follow" heating member 16' (16) and pads 17' (17) of jaws 8' (8).

More specifically, as slides 7, 7' move down, heating members 16, 16' and pads 17, 17' of jaws 8, 8' move along respective portions $H_3$, $H_3'$ from their respective top dead-centre positions S, S', and jaws 8, 8' move into their respective closed positions.

Next, heating members 16, 16' and pads 17, 17' cooperate with tube 2 and travel along respective sealing paths G, G' while jaws 8, 8' are in their respective closed positions.

Heating members 16, 16' and pads 17, 17' begin parting along respective portions $H_1$, $H_1'$, until jaws 8, 8' reach respective bottom dead-centre positions I, I'.

As slides 7, 7' move up, heating members 16, 16' and pads 17, 17' of jaws 8, 8' travel along portions $H_2$, $H_2'$, along which they move from respective bottom dead-centre positions I, I' to respective top dead-centre positions S, S'.

In other words, slide 7 moves up (down) with jaws 8 moving into the fully-open (closed) position, and at the same time as slide 7' moves down (up) with jaws 8' nearing or in the closed (fully-open) position, so that arms 11' of assembly 6' pass smoothly, with no interference, between arms 11 of assembly 6.

More specifically, as heating members 16, 16' and pads 17, 17' travel along portions $H_1$, $H_1'$ and $H_2$, $H_2'$ and sealing paths G, G', the movements of rods 22 are determined solely by addends $P_1$, $P_1'$, and the trajectories of jaws 8, 8' between the fully-open and closed positions correspond with the basic trajectories.

Conversely, as heating members 16, 16' and pads 17, 17' travel along portions $H_3$, $H_3'$, the movements of rods 22 are determined by the sum of addends $P_1$ and $P_2$, $P_1'$ and $P_2'$, and the trajectories of jaws 8, 8' differ from the respective basic trajectories, i.e. are closer to or further away from axis A, depending on the correction determined by addends $P_1'$ and $P_2'$.

Operation of unit 1 is described below with reference to the formation of one package 3, and starting with heating member 16 and pads 17 of jaws 8 in their respective top dead-centre positions S.

From this position, heating member 16 and pads 17 travel along portions $H_3$ of repositioning paths H, by the end of which jaws 8 are in the closed position.

More specifically, as heating member 16 and pads 17 move along respective portions $H_3$, fasteners 13, 14 are brought together into the engaged position, in which they are held by cylinder 15.

Heating member 16 and pads 17 then travel along sealing paths G, with jaws 8 in the closed position.

Along sealing paths G, heating member 16 and pads 17 cooperate with one another to form sealing strip 9a of package 3.

The formation of sealing strip 9a causes a quantity of food product above sealing strip 9a to be pumped into tube 2 in the direction shown in FIG. 5, i.e. in the opposite direction to the travelling direction of tube 2.

The pumped quantity of product flows through channel 24, of width M, defined on either side of axis A by heating member 16' and pads 17', which are coming to the end of respective portions $H_3'$ and "lagging" with respect to heating member 16 and pads 17 of jaws 8.

Control schemes P' are generated to adjust width M—and therefore the resistance of channel 24 to throughflow of the pumped quantity of product—on the basis of the viscosity of the food product and/or the output rate of unit 1.

More specifically, width M is adjusted just before fasteners 13', 14' move into the engaged position.

Next, fasteners 13', 14' move into the engaged position, and heating member 16' and pads 17' complete respective portions $H_3'$ and then cooperate to form sealing strip 9b.

Control schemes Q' govern operation of rods 21' so that, at least when forming sealing strip 9b, heating member 16 and pads 17 are separated from heating member 16' and pads 17' by a distance L (measured parallel to axis A) which is a function of value Y.

Acquisition unit 40 thus controls the distance between sealing strips 9a, 9b, and hence the height and weight of the formed package 3, on the basis of value Y.

Once sealing strip 9b is completed, knife 27' is activated to cut package 3 off tube 2.

Just before fasteners 13', 14' move into the engaged position, fasteners 13, 14 are released and, after sealing strip 9b is formed, jaws 8 begin parting, and heating member 16 and pads 17 start moving along respective portions $H_1$ towards respective bottom dead-centre positions I.

Next, heating member 16 and pads 17, controlled by control schemes P, Q controlling rods 21, 22, each move along respective portions $H_2$, $H_3$ and again along respective sealing path G.

More specifically, along portions $H_3$, control scheme P adjusts the width M of channel 24, and control scheme Q positions heating member 16 and pads 17 at distance L—depending on value Y—from heating member 16' and pads 17' as the next sealing strip 9a is formed defining the top of the next package 3, which is defined at the bottom by the previously formed sealing strip 9b.

As heating members 16, 16' and pads 17, 17' travel along sealing paths G, G', respective rods 22, 22' are controlled by control schemes P, P' to keep heating members 16, 16' and respective pads 17, 17' pressed tightly together, and so compensate for any slack caused by tolerances in the approach movements of fasteners 13, 14, 13', 14' and in the control circuits of cylinders 15, 15', and by the tendency of jaws 8, 8' and therefore of respective heating members 16, 16' and pads 17, 17' to part when fasteners 13, 14, 13', 14' are released.

The advantages of unit 1 and the method according to the present invention will be clear from the above description.

In particular, unit 30 regulates the displacements of rods 21, 21' by means of control schemes Q, Q' and on the basis of value Y while unit 1 is running.

This means distance L between sealing strips 9a and 9b of each package 3 can be real-time controlled and adapted precisely, continuously, and repeatably to value Y corresponding to the desired weight or volume of package 3.

Since the volume of packages 3 depends on distance L, unit 30 enables the weight of packages 3 to be real-time adapted precisely, repeatably and controllably to value Y.

Unit 1 therefore produces packages 3 of predetermined weight without having to be stopped, and without impairing the look of packages 3, as when controlling the weight of packages 3 by applying shims to the walls of half-shells 20 cooperating with the outer faces of packages 3. Using shims, in fact, calls for repeated shutdowns of unit 1 to work out the right size of and apply the shims.

Unit 1 has an even greater advantage over shimming when working with underfilled packages 3, i.e. in which the volume of the food product is smaller than the volume of package 3. In which case, shims would leave marks on the portions of the outer walls of package 3 surrounding the empty part of package 3.

By means of addends $P_2$, $P_2'$ of control schemes P, P', unit 30 also enables precise, continuous, repeatable, real-time adjustment of width M of channel 24, i.e. the distance between heating member 16' (16) and pads 17' (17), once sealing strip 9a (9b) is formed, and before sealing strip 9b (9a) is formed.

Depending on the viscosity of the pourable food product and/or the output rate of unit 1, unit 30 therefore adjusts the resistance of channel 24 to outflow of the food product contained in the part of the tube defined between heating member 16 and pads 17 and heating member 16' and pads 17', and which is "pumped" upwards as sealing strip 9a (9b) is formed.

Adjusting the flow resistance of channel 24 adjusts the amount of food product left inside package 3 once jaws 8' (8) reach the closed position and sealing strip 9b (9a) is formed by heating member 16' (16) and pads 17' (17). By adjusting the flow resistance of channel 24, the end weight of package 3 can therefore be adjusted even in the case of particularly viscous pourable food products, such as béchamel, and high output rates of unit 1.

Moreover, addends $P_1$, $P_1'$ of control schemes P, P' are generated by acquisition unit 40 to keep heating members 16, 16' and respective pads 17, 17' pressed tightly together and onto tube 2 along respective sealing paths G, G'.

So doing takes up any first slack, perpendicular to axis A, between heating members 16, 16' and respective pads 17, 17', caused by inevitable tolerances in the approach trajectories of fasteners 13, 14, 13', 14', and in the hydraulic gripping force exerted by cylinders 15, 15'. Such first slack would have the effect of parting heating members 16, 16' and respective pads 17, 17' perpendicularly to axis A when jaws 8, 8' are in the closed position, thus resulting in inevitable, hard-to-control variations in the end weight of packages 3.

The contribution of addends $P_1$, $P_1'$ along sealing paths G, G' therefore reduces the variation in weight of packages 3, caused by such first slack, even when working at high output rates of unit 1.

Addends $P_1$, $P_1'$ also compensate for any second slack, perpendicular to axis A, caused by fasteners 13, 14, 13', 14' being released while jaws 8, 8' are still in the closed position, and heating members 16, 16' and respective pads 17, 17' have not yet completed respective sealing paths G, G'.

More specifically, such second slack corresponds to the clearance, perpendicular to axis A, that would be formed between heating members 16, 16' and pads 17, 17' by fasteners 13, 14, 13', 14' being released before heating members 16, 16' and pads 17, 17' complete respective sealing paths G, G'.

In this case too, the contribution of addends $P_1$, $P_1'$ along sealing paths G, G' prevents the second slack from complicating weight control of packages 3, particularly at high output rates of unit 1.

Clearly, changes may be made to unit 1 and the method as described herein without, however, departing from the scope of the accompanying Claims.

In particular, unit 1 may be of the type comprising two counter-rotating chain conveyors defining a cavity along which tube 2 is fed; one of the conveyors is equipped with a number of jaws fitted with heating members, and the other with a number of counter-jaws fitted with pressure pads and which cooperate with the jaws to grip and heat seal respective cross sections of the tube of packaging material.

The invention claimed is:

1. A method of producing a sealed package of a food product pourable into a tube of packaging material, the method comprising:
   feeding said tube along an axis;
   moving at least one first pair of jaws, including first and second sealing members, and at least one second pair of jaws, including third and fourth sealing members, cyclically and alternately along respective sealing paths parallel to said axis, and along respective repositioning paths along which said first and second jaws move with respect to said tube;
   moving said first pair of jaws and second pair of jaws, as they travel along the respective sealing paths, into a closed position in which said first and second sealing members grip said tube and said third and fourth sealing members grip said tube and respectively form, at different times, a first seal and a second seal sealing the tube and defining respective opposite ends of said package;
   moving said first pair of jaws and second pair of jaws, as they travel along the respective repositioning paths, into an open position, in which said first and second sealing members are detached from said tube and said third and fourth sealing members are detached from said tube;
   acquiring a desired weight or volume of a said package;
   using a processor to determine a first distance separating said first seal and said second seal based on said desired weight or volume of said package;
   forming said second seal at a position spaced apart from said first seal in a direction parallel to said axis by said first distance; and
   adjusting a second distance, crosswise to said axis, between said third and fourth sealing members of said second pair of jaws, on the basis of at least one of a first parameter relating to a viscosity of said food product, and a second parameter relating to an output rate of said packages, and after said first and second sealing members of said first pair of jaws have formed said first seal, and before said third and fourth sealing members of said pair of second jaws form said second seal.

2. A method as claimed in claim 1, comprising generating, on the basis of said desired weight or volume of said package, a first and second control scheme respectively controlling a first and second actuator assembly for respectively moving said first pair of jaws and second pair of jaws parallel to said axis along said respective sealing paths; said first and second control scheme being generated to position said first and second sealing members of said first pair of jaws at said first distance from said third and fourth sealing members of said second pair of jaws, at least when said third and fourth sealing members grip the tube to form said second seal.

3. A method as claimed in claim 2, wherein, at said generating step, at least said first control scheme is generated as the sum of at least a first addend dependent on said desired weight or volume of said package, and a second addend independent of said desired weight or volume of said package.

4. A method as claimed in claim 1, comprising engaging first and second fasteners, fitted respectively to said first and second jaws, along respective end portions of the respective repositioning paths; said adjustment of said second distance preceding the engagement of said second fasteners.

5. A method as claimed in claim 1, wherein said adjustment of said second distance comprises generating, on the basis of said at least one of said first and second parameter, at least a third control scheme controlling a third actuator assembly for moving said second jaws between said open and closed positions.

6. A method as claimed in claim 5, wherein, at said generation of said third control scheme, said third control scheme is generated as the sum of at least a third addend dependent on said at least one of said first and second parameter, and at least a fourth addend independent of said parameters.

7. A method as claimed in claim 6, comprising releasing said first and second fasteners before the respective said first pair of jaws and second pair of jaws complete the respective said sealing paths; and wherein said generation of said third control scheme comprises generating said fourth addend to press said third and fourth sealing members of said second pair of jaws together, at least along end portions of the respective said sealing paths and after said step of releasing said second fasteners.

8. A method as claimed in claim 5, wherein, at said generation step, said third control scheme is generated independently of said desired weight or volume of said package.

9. A method as claimed in claim 6, wherein said fourth addend is generated to move said second pair of jaws between said closed and open positions along a basic trajectory; and in that said third addend is generated to correct said basic trajectory as said second jaws travel along at least the respective said end portions of the respective said repositioning paths.

\* \* \* \* \*